(12) United States Patent
Wu

(10) Patent No.: US 8,384,906 B2
(45) Date of Patent: Feb. 26, 2013

(54) RANGE ADJUSTABLE REAL-TIME AUTOCORRELATOR

(76) Inventor: Yeheng Wu, Solon, OH (US)

( * ) Notice: Subject to any disclaimer, the term of this patent is extended or adjusted under 35 U.S.C. 154(b) by 404 days.

(21) Appl. No.: 12/697,295

(22) Filed: Jan. 31, 2010

(65) Prior Publication Data

US 2011/0188045 A1    Aug. 4, 2011

(51) Int. Cl.
*G01B 9/02* (2006.01)
(52) U.S. Cl. ............................................. 356/450
(58) Field of Classification Search ........... 356/450–452
See application file for complete search history.

(56) References Cited

U.S. PATENT DOCUMENTS

| 4,265,540 A | 5/1981 | Doyle |
| 4,406,542 A | 9/1983 | Boggy |
| 4,872,756 A | 10/1989 | Hill |
| 6,204,926 B1 * | 3/2001 | Maznev et al. ............... 356/521 |
| 6,603,539 B1 * | 8/2003 | Meier ....................... 356/139.03 |
| 7,224,467 B2 * | 5/2007 | Tsai ............................. 356/496 |
| 7,230,715 B2 * | 6/2007 | Li ................................ 356/450 |
| 7,239,775 B2 * | 7/2007 | Xu et al. ......................... 385/25 |
| 7,643,212 B1 * | 1/2010 | Sokoloff et al. ......... 359/490.02 |

OTHER PUBLICATIONS

Zafer A. Yasa and Nabil M. Amer, A rapid-scanning autocorrelation scheme for continuous monitoring of picosecond laser pulses, Optics Communications, 36 (5), 406, 1981.

* cited by examiner

*Primary Examiner* — Michael A Lyons
(74) *Attorney, Agent, or Firm* — Renner, Otto, Boisselle & Sklar LLP

(57) ABSTRACT

An autocorrelator to measure pulse width of an incident laser divides the incident laser to a reference beam and a controlled beam. Two rotating parallel mirrors are used as an optical delay component for the controlled beam. The axis of rotation of the rotating parallel mirrors and the incident beam on the parallel mirrors are on the same horizontal plane. There is a small angle δ between them. The scan range can be easily adjustable by changing this angle δ. Using this arrangement, real-time and range adjustable autocorrelator is realized.

23 Claims, 5 Drawing Sheets

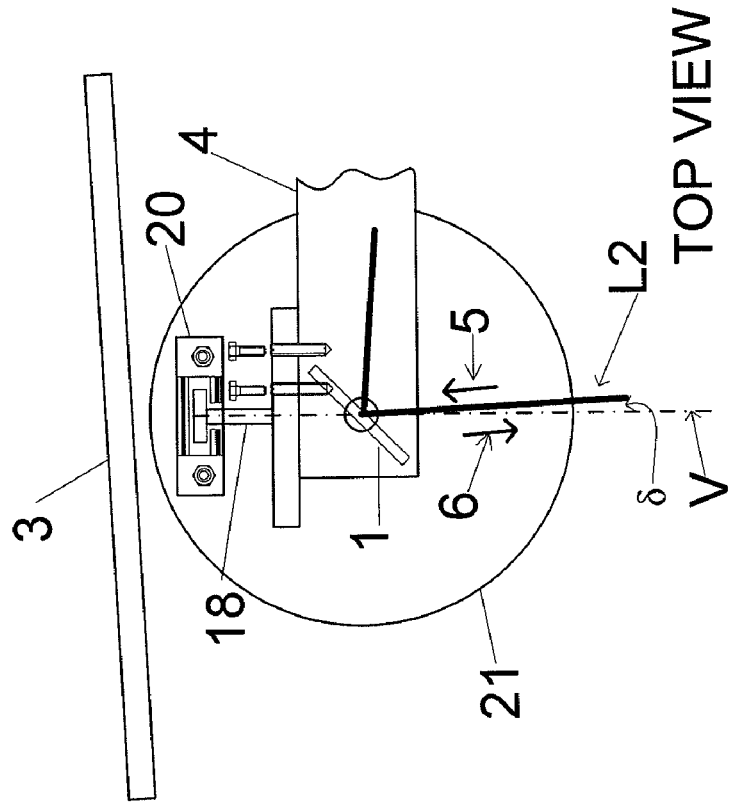
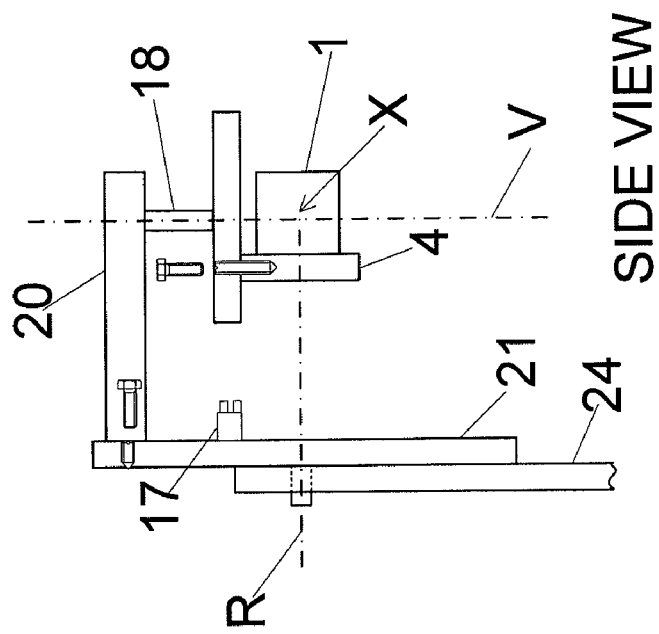
FIG. 2B TOP VIEW
FIG. 2A SIDE VIEW

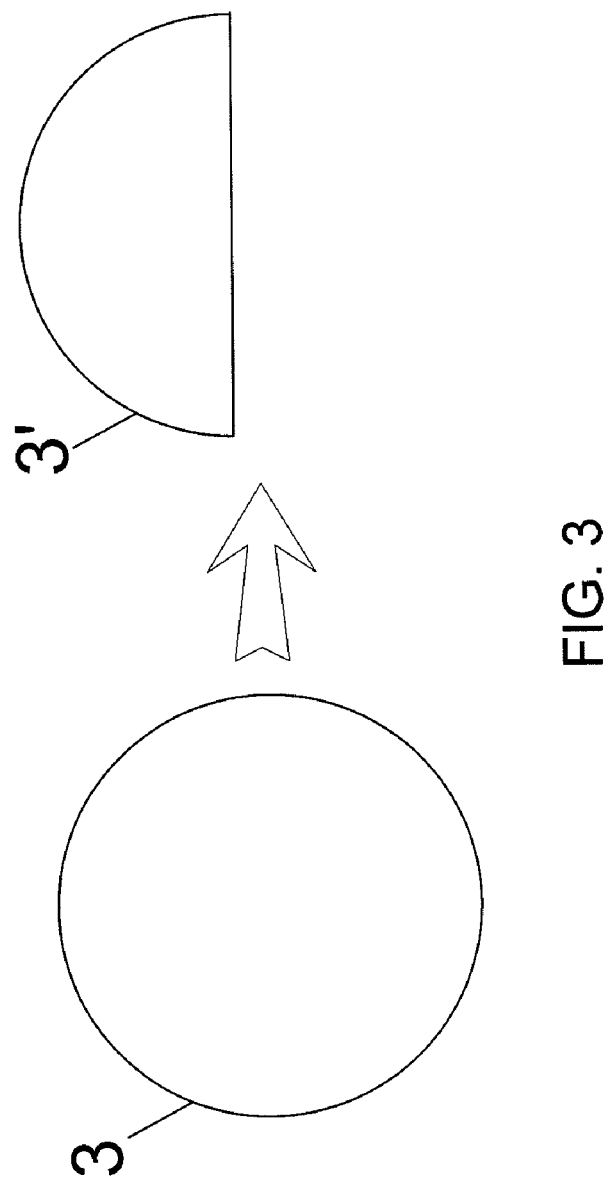

RANGE ADJUSTABLE REAL-TIME AUTOCORRELATOR

BACKGROUND OF THE INVENTION

1. Field

This invention relates to pulse laser measurement and characterization.

2. Background

Autocorrelators have been widely used to measure the pulse width of ultrafast laser pulses. An autocorrelation method includes splitting a laser beam into two, delaying one of them in time/space, and recombining them for time-correlation characterization. A rapid scanning autocorrelation detector device disclosed in U.S. Pat. No. 4,406,542 was invented in 1983. That device includes as an essential part a glass block which changes the delay of the light beam pulse while the glass block is rotating. In that device the optical path length of the light beam inside the rotating glass block changes as the glass block rotates. The dispersion inside the glass is proportional to the travel distance and the spectrum width of the light beam. The device works well with picosecond or nano-second laser pulses, which usually have narrow spectrum bandwidth. However, a 100 femto-second (fs) laser pulse has a spectrum width of about 10 nanometer (nm). There will be considerable distortion if that device is used to measure a 100 fs laser, which is a disadvantage of such device. The same issue exists in other designs of autocorrelators, such as are disclosed in U.S. Pat. No. 4,190,366 and U.S. Pat. No. 4,265,540.

A second disadvantage of the device of U.S. Pat. No. 4,406,542 is that the beam intensity of the delay line changes when the glass block is rotating. It is because the transitivity of the dielectric depends largely on the incident angle. Thus, the measured autocorrelation trace is incorrect.

A third disadvantage in the devices of the three above-mentioned US patents is that the measurement range is fixed after the device is made. This disadvantage becomes a problem when a device having 100 ps scan range is trying to measure a 100 fs pulse which has low repetition rate, such as 1 kHz. The device will not pick up enough points (pulses) in one scan. Thus, the measurement becomes impossible.

SUMMARY

In order to overcome the shortfalls (disadvantages) in the current optical autocorrelators, new autocorrelation methods are needed. In this document, I will describe an autocorrelation method which is able to measure a laser with low repetition rate. There is no dispersion in the pulse since only reflective optical components are used. The new invention also provides an easy way to adjust the scan range. As a result of this, it also improves the precision of the measurement.

BRIEF DESCRIPTION OF THE DRAWINGS

In the drawings, closely related figures have the same number but different alphabetic suffixes.

FIG. 2A is a side elevation view of the optical delay line.

FIG. 2B is a top view of the optical delay line.

FIG. 3 shows how to modify mirror 3 to achieve half duty cycle scan.

DETAILED DESCRIPTION

Figure 1:
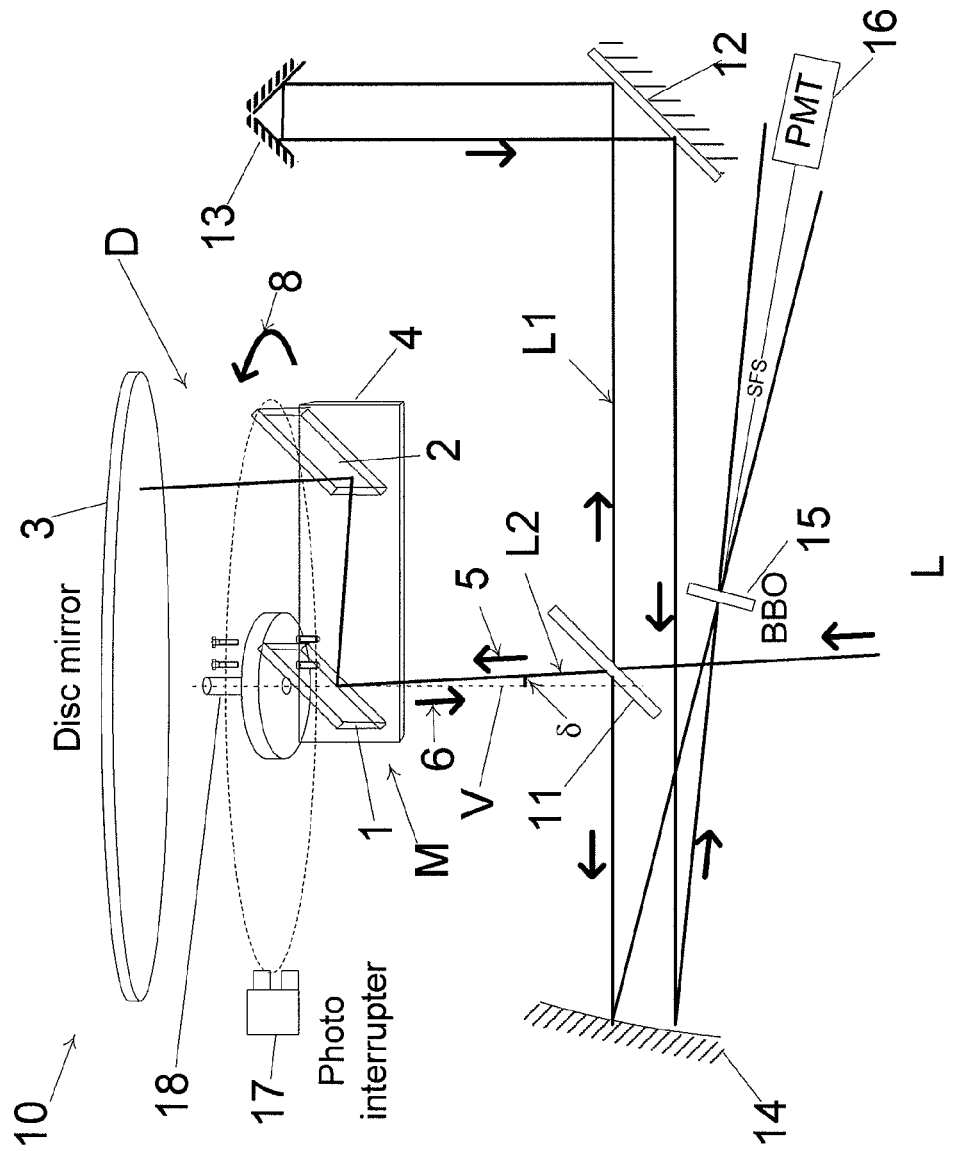
FIG. 1 is a schematic top view layout of the autocorrelator (partially perspective view).

Referring to the drawings, an dinitially to FIGS. 1, 2A and 2B, the pulse duration of the laser light L can be revealed by intensity autocorrelation between two child pulses $L_1$ and $L_2$ created by a beam splitter 11. Two child pulses propagate separately and one of them has a variable travel distance. They are focused on the same spot of a nonlinear crystal 15 in order to generated sum frequency signal (SFS). The SFS intensity is proportion to the spatial and temporal overlap of the two beams $L_1$ and $L_2$. The temporal overlap can be controlled by changing the travel distance of one light trace.

Such changes can be set to be linearly proportional to the scan time. Thus, the SFS has a temporal profile that reflects the temporal profiles of the original laser pulse. From the temporal profile of the SFS signal, we can calculate the laser pulse width.

The essential part used in this autocorrelator system 10 invention is a parallel mirror set M in delay line D. The function of this parallel mirror M set can be found in a published paper (Opt. Commun. 36(5), 406, 1980). A first embodiment is depicted in FIGS. 1, 2A and 2B. As shown in FIG. 1, two parallel mirrors 1 and 2 of the mirror set M work as a variable optical delay component when they rotate. Mirror 1 and 2 are mounted on a base 4, which is a rotating arm. A horizontal laser beam $L_2$ shines on mirror 1 at approximately 45° and then is reflected to hit mirror 2. The outcome beam from mirror 2 hits on mirror 3 at normal angle. FIG. 3 illustrates that the mirror 3 may be a full circle in its plan view or in another embodiment may be half circle in its plan view. See the half duty cycle described below. Thus, the beam $L_2$ represented by arrow 5 is reflected back to where it comes, as is represented by arrow 6. The optical delay is continuously changed via rotating the mirrors 1 and 2 of mirror set M, which, as is shown in FIG. 1, for example, are mounted together with the base 4 to a plate 19 that in turn is mounted to drive shaft 18 of a motor 20. The rotating axis of the motor drive shaft 18 is designated V, and as is illustrated in the side view of FIG. 2A that rotating axis primarily is generally vertically oriented. The motor 20 is shown in FIG. 2B, for example. The rotating is represented by arrow 8. The rotating axis V of the motor 20 is shifted (moved) in the horizontal plane and is not parallel to the incident laser beam L or $L_2$, as is seen in FIG. 1. The incident angle of the laser beam L on mirror 1 changes as the motor 20 rotates the mirrors 1 and 2 vertically.

Let's assume δ to be the angle between the rotating axis V and the incident laser beam L, and Θ to be the rotation angle of the delay line D mirrors 1 and 2 arm. We further assume that when the delay line D is horizontal (as shown in FIG. 2), Θ=0. We then can calculate the incident angle at the mirror 1 to be $$\theta_{inc} = \cos^{-1}\left(\frac{\sqrt{2}}{2}(\cos\delta - \cos\theta\sin\delta)\right).$$

With small angle approximation (δ is close to 0), we then have $\theta_{inc} \cong 45° + \delta \cos\theta$. Therefore, the optical delay change is $2d(\cos(\delta \cos\theta) + \sin(\delta \cos\theta) - 1)$, where d is the distance from mirror 1 to mirror 2. Using small angle approximation again, we get the approximation of delay to be 2dδcos Θ, which is linearly proportion to the cosine of the angle of rotation. Thus, the full optical delay range is from $-2d\delta$ to $2d\delta$, which is also the scan range.

The incoming laser beam L is split into two beams $L_1$ and $L_2$ by beam splitter 11. One of the beams $L_1$ is directed to a flat mirror 12 and roof mirror 13, which shifts the reflected beam laterally on the horizontal plane. This arm has a fixed optical delay. The roof mirror may be mounted on a translation stage. Another beam $L_2$ goes to the rotating delay line D, which was described above. The two beams have the same propagation direction before they hit a curved mirror 14. The curved mirror 14 focuses the two beams on a BBO crystal 15 at the same spot but at different incident angles. The sum frequency signal (SFS) generation, which is in between the two beams, is monitored by a photon detector 16—photo multiplier tube (PMT). Other nonlinear crystals may be used for the BBO crystal, such as LBO, KDP, KTP and any other second harmonic generation crystals. The signal is amplified and visualized on an oscilloscope, a computer or other waveform devices. Other types of photon detector can be used if as long as it can pick up the SFS signal.

Compared to the method described in the published paper (Opt. Commun. 36(5), 406, 1980), the new method has an optical delay component D rotating very differently to achieve real-time and adjustable range scan, although they both include two parallel mirrors. In the published paper, the rotating axis is perpendicular to the incident beam. In the new design, the rotating axis and the incident beam are both in the horizontal plane. There is a very small angle between them.

Change scan range: Referring also to FIGS. 2A and 2B, the autocorrelator device 10 can perform rapid scan of laser pulse width in any range with the same precision. The scan range is adjustable by changing d or $\delta$. The distance between mirror 1 and mirror 2, d is usually fixed when the instrument is made. The adjustment of $\delta$ is done by turning the delay motor 20 (with the optics mounted) relative to a vertical axis R. Motor 20 is mounted on a rotation stage, which includes plate 21 that is rotatably mounted to affixed point 24. The rotating axis R of rotatable plate 21 intersects at a cross point X with the rotating axis V of the motor 20 shaft 18. The cross point X is on the surface of mirror 1. Since rotating the parallel set of mirrors 1, 2 does not change the direction of the beam, other optical elements do not need to be realigned. Thus, changing the scan range is very simple and easy.

Figure 5A:
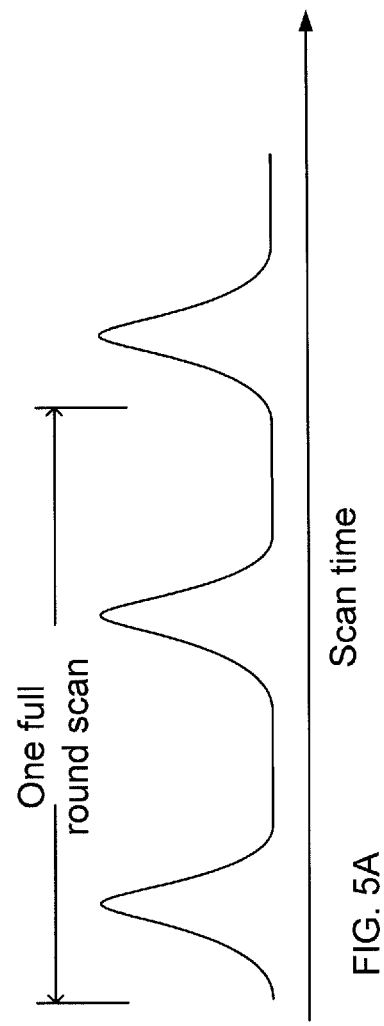
FIG. 5A and FIG. 5B depict autocorrelation traces that correspond to full scan and half scan respectively.
Figure 5B:
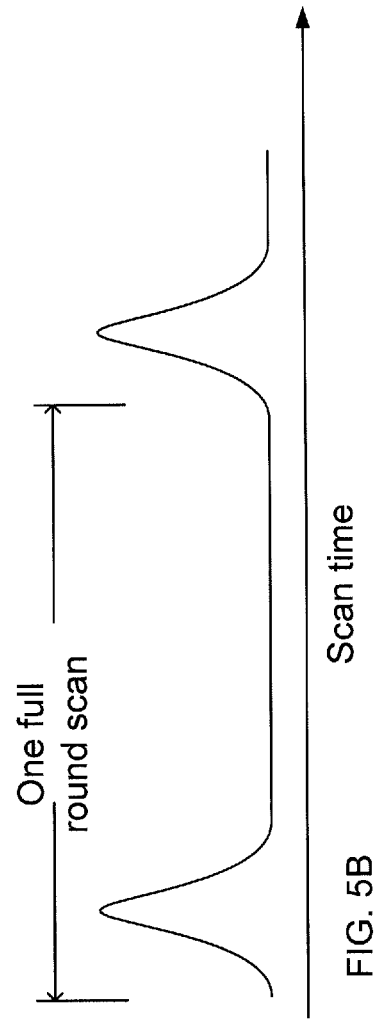

Half duty cycle scan: Referring to FIG. 3 and also to FIGS. 5A and 5B, because the delay line D is continuously rotating at one direction, the optical delay changes from $2d\delta$ to $-2d\delta$ and from $-2d\delta$ to $2d\delta$. Thus, the correlation scan process passes the zero delay twice in one full round scan. Theoretically, the two autocorrelation signals should be identical (FIG. 5A). Any of these signals is adequate for the pulse measurement. However, to avoid the noise and imperfections of the autocorrelator system 10, one can cut the mirror 3 into half to perform half duty scan. An example is shown in FIG. 3. The output signal for this configuration is depicted in FIG. 5B. This also reduces the cost of the instrument.

Figure 4:
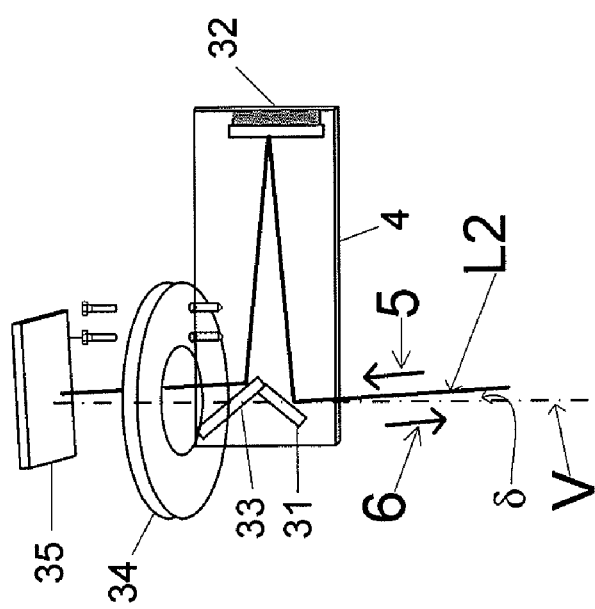
FIG. 4 shows another embodiment of optical delay line in which the rotation arm is folded (optically) by mirror 32—it has the same function as the delay line depicted in FIG. 3.

Folded delay line: Referring to FIG. 4, the delay line depicted in FIG. 2B needs a large round flat mirror 3 as a back reflector. The large, high quality flat mirror is expensive and heavy. A way to avoid this is to optically fold the arm (as is shown in FIG. 4) using rotating reflectors 31, 32, 32 on the rotating support 4 instead of the set of parallel mirrors 1, 2. The delay in this case is still from $-2d\delta$ to $2d\delta$, where d is the travel distance from mirror 31 to 32 to 33 via opening in motor or motor support 34 to a back reflector 35.

Low repetition rate pulse measurement: One can perform rapid real-time measurements on pulsed laser with any repetition rate. Because the scan range is adjustable by changing d or $\delta$, as is described above, all of (or half of) the pulses can be utilized to generate autocorrelation signal. For example, with the delay motor rotating at 1 Hz, 10 points will be generated for a 10 Hz laser (5 points for half duty scan). This is enough to construct a correlation curve to calculate the pulse duration. Of course, the measurement becomes much easier and more precise if the pulse repetition rate is higher. The autocorrelator can perform much faster real-time measurement by increasing the rotation speed of delay motor 20. The speed of the motor is monitored by a photo interrupter 17 to generate a synchronizing signal.

I claim:

1. A real time range adjustable real-time autocorrelator comprising:
    an input configured to receive an incident light beam,
    a beam splitter configured to split the incident light beam to a controlled light beam and a reference light beam,
    a motor,
    one set of parallel mirrors which is mounted on the motor, wherein the delay line rotates constantly and continuously by the motor such that the rotating axis has a small angle $\delta$ to the light that is incident thereon,
    a rotation stage configured to change scan range of the autocorrelator,
    a flat minor configured to receive the light beam from the set of parallel mirrors and to reflect back the light beam to the set of parallel minors,
    a roof mirror configured to receive the reference light beam from the beam splitter and to reflect the reference light beam back and laterally shifts the reference light beam a certain distance,
    a curved minor configured to focus the controlled light beam from the delay line and the reference light beam from the roof minor on the same spot of a nonlinear crystal which generates an intensity correlation between two pulses of light incident thereon to provide a correlation signal,
    a detector configured to monitor the intensity correlation signal, and
    a photo interrupter configured to monitor which monitors the speed of motor and to generate a synchronizing signal.

2. A range adjustable real-time autocorrelator, comprising
    an input receiving incident laser light, the incident laser light including laser pulses,
    a beam splitter configured to divide the incident laser light to a reference beam in a reference beam light path and a controlled beam in a controlled beam light path,
    a delay line configured to change the optical delay of the controlled beam, the delay line including
        a reflector,
        a set of parallel mirrors,
        a support configured to support the set of parallel mirrors for rotation about an axis of rotation to receive and to reflect light in the controlled beam light path,
        the set of parallel mirrors positioned with respect to the controlled beam light path to receive incident light from the beam splitter, to reflect light to the reflector, to receive light from the reflector and to reflect light back toward the beam splitter, and
        an angle adjuster to adjust the angle of the axis of rotation relative to the direction of light from the beam splitter that is initially incident on the set of parallel mirrors.

3. The autocorrelator of claim 2, wherein the reflector and the set of parallel minors are relatively oriented such that the reflector is normal to the light path of light reflected to the reflector by the set of parallel mirrors.

4. The autocorrelator of claim 2, further comprising a motor configured to rotate the support and thereby to rotate the set of parallel mirrors.

5. The autocorrelator of claim 4, wherein the motor is mounted on a rotatable stage, the motor has a drive output, and wherein the angle adjuster is configured to adjust the angle of the rotatable stage and thereby to adjust the angle of the output drive relative to the direction of light from the beam splitter that is initially incident on the set of parallel mirrors thereby to adjust the angle of the axis of rotation.

6. The autocorrelator of claim 5, wherein the rotatable stage comprises a mounting plate for the motor, and wherein the angle adjuster comprises an adjuster of the angle of the mounting plate relative to a fixed support.

7. The autocorrelator of claim 5, wherein the support with the set of parallel mirrors is mounted in fixed relation with respect to the motor to maintain the orientation of the support and set of parallel mirrors with respect to the motor output drive.

8. The autocorrelator of claim 7, further comprising reflectors for folding the light path in the delay line between the set of parallel mirrors and the reflector.

9. The autocorrelator of claim 2, wherein the reflector is configured to reflect all light that is received from the set of parallel mirrors in the controlled beam light path as the set of parallel mirrors rotate.

10. The autocorrelator of claim 2, wherein the reflector is configured to reflect light received from the set of parallel mirrors in the controlled beam light path only during part of the rotational orientation of the set of parallel mirrors.

11. The autocorrelator of claim 10, wherein the reflector is a semicircular disc and the scan provided by the autocorrelator is a half duty cycle scan.

12. The autocorrelator of claim 2, further comprising a roof mirror in the reference light beam path from the beam splitter.

13. The autocorrelator of claim 12, wherein the roof mirror is mounted on a translation stage.

14. The autocorrelator of claim 2, further comprising a curved mirror configured to receive light in the controlled beam light path after such light has been reflected by the set of parallel mirrors and to receive light from the reference beam light path and to direct such received light to a nonlinear crystal that generates an intensity correlation output.

15. The autocorrelator of claim 14, further comprising a detector configured to monitor the intensity of the correlation signal.

16. The autocorrelator of claim 15, further comprising a synchronizer configured to synchronize the correlation signal with the rotation of the rotation of the set of parallel mirrors.

17. The autocorrelator of claim 14, wherein the nonlinear crystal comprises at least one of BBO, LBO, KDP, KTP, or any other second harmonic generation crystal or nonlinear crystal.

18. A method of measuring laser pulse width using an autocorrelator, comprising
receiving an incident laser beam,
splitting the incident laser beam into a controlled beam and a reference beam, and
directing the controlled beam to a delay line that includes mirrors that are rotating about an axis that is substantially parallel to the incident laser beam direction to effect a delay function, and
subsequently combining the delayed controlled beam and reference beam to obtain information relating to pulse width of pulses of the incident laser beam.

19. The method of claim 18, said directing the controlled beam to a delay line that includes mirrors that are rotating comprises directing to a set of parallel mirrors.

20. The method of claim 18, said directing the controlled beam to a delay line that includes mirrors that are rotating comprises directing the controlled beam in a folded optical path including a three-piece mirror set.

21. The method of claim 20, further comprising using a motor to rotate the three-piece mirror set, and wherein the motor includes an opening passing light from the three-piece mirror set, and further comprising reflecting light received from the three-piece mirror set via the opening back through the opening to the three-piece mirror set.

22. An optical delay line comprising
an input configured to receive light,
a reflector,
a set of parallel mirrors,
a support configured to support the set of parallel mirrors for rotation about an axis of rotation to receive and to reflect light in a controlled beam light path,
the set of parallel mirrors positioned with respect to the controlled beam light path to receive incident light, to reflect light to the reflector, to receive light from the reflector and to reflect the light received from the reflector.

23. The optical delay line of claim 22, further comprising an angle adjuster to adjust the angle of the axis of rotation relative to the direction of light from the beam splitter that is initially incident on the set of parallel mirrors.

\* \* \* \* \*

UNITED STATES PATENT AND TRADEMARK OFFICE
CERTIFICATE OF CORRECTION

| | | |
|---|---|---|
| PATENT NO. | : 8,384,906 B2 | Page 1 of 1 |
| APPLICATION NO. | : 12/697295 | |
| DATED | : February 26, 2013 | |
| INVENTOR(S) | : Yeheng Wu | |

It is certified that error appears in the above-identified patent and that said Letters Patent is hereby corrected as shown below:

Claims, col 4, line 26, "a flat minor configured to receive the light beam" should read --
"a flat mirror configured to receive the light beam"

Claims, col 4, line 28, "to the set of parallel minors" should read --
"to the set of parallel mirrors"

Claims, col 4, line 33, "a curved minor configured to focus the controlled light" should read --
"a curved mirror configured to focus the controlled light"

Claims, col 4, line 35, "from the roof minor on the same spot of a nonlinear" should read --
"from the roof mirror on the same spot of a nonlinear"

Claims, col 4, line 67, "the set of parallel minors are relatively oriented such that the" should read --
"the set of parallel mirrors are relatively oriented such that the"

Signed and Sealed this
Seventh Day of May, 2013

Teresa Stanek Rea
*Acting Director of the United States Patent and Trademark Office*